(12) United States Patent
Dyson et al.

(10) Patent No.: US 8,056,775 B2
(45) Date of Patent: Nov. 15, 2011

(54) DISPENSER FOR A DOMESTIC APPLIANCE

(75) Inventors: James Dyson, Gloucestershire (GB);
Peter David Gammack, Malmesbury
(GB); David Stuart Cole, West Sussex
(GB); Michael William John Cornish,
Bristol (GB)

(73) Assignee: Dyson Technology Limited,
Malmesbury, Wiltshire (GB)

( * ) Notice: Subject to any disclaimer, the term of this
patent is extended or adjusted under 35
U.S.C. 154(b) by 777 days.

(21) Appl. No.: 12/149,464

(22) Filed: May 1, 2008

(65) Prior Publication Data

US 2008/0272156 A1 Nov. 6, 2008

(30) Foreign Application Priority Data

May 4, 2007 (GB) .................................. 0708704.2

(51) Int. Cl.
*B67D 3/00* (2006.01)
(52) U.S. Cl. ........................ 222/504; 222/539
(58) Field of Classification Search .................. 222/504,
222/505, 522–525, 513–516, 531, 535, 538,
222/539, 461.1, 461.5
See application file for complete search history.

(56) References Cited

U.S. PATENT DOCUMENTS

| | | | | |
|---|---|---|---|---|
| 1,629,303 A | * | 5/1927 | Phillips | 222/519 |
| 1,859,126 A | * | 5/1932 | Boeuf | 222/505 |
| 1,912,304 A | * | 5/1933 | Phillips | 222/513 |
| 1,924,057 A | * | 8/1933 | Draper et al. | 222/509 |
| 2,424,101 A | * | 7/1947 | Lari | 222/519 |
| 3,033,467 A | | 5/1962 | Hofer | |
| 3,039,656 A | * | 6/1962 | Wentz | 222/173 |
| 4,025,048 A | * | 5/1977 | Tibbitts | 251/144 |
| 4,997,108 A | * | 3/1991 | Hata | 222/105 |
| 5,069,364 A | * | 12/1991 | McGill | 222/95 |
| 5,100,033 A | * | 3/1992 | Cho | 222/523 |
| 5,961,009 A | * | 10/1999 | Rekers | 222/523 |
| 6,053,475 A | * | 4/2000 | Batschied et al. | 251/351 |
| 6,758,056 B1 | * | 7/2004 | Cathenaut et al. | 62/345 |
| 2010/0107891 A1 | | 5/2010 | Vanderstegen-Drake et al. | |

FOREIGN PATENT DOCUMENTS

| | | |
|---|---|---|
| DE | 3742930 | 10/1988 |
| DE | 20017859 | 2/2002 |
| DE | 202005011476 | 10/2005 |
| EP | 1 180 459 | 2/2002 |
| EP | 1 374 748 | 8/2004 |

(Continued)

OTHER PUBLICATIONS

GB Search Report mailed Sep. 4, 2007, directed to counterpart GB application No. GB0708704.2; 2 pages.

(Continued)

*Primary Examiner* — Lien Ngo
(74) *Attorney, Agent, or Firm* — Morrison & Foerster LLP

(57) ABSTRACT

An appliance has a casing and a dispenser. The dispenser includes a dispensing member for dispensing a fluid and is movable between a first position in which at least a part of the dispensing member is located within the casing and a second position in which the dispensing member projects from the casing. The dispensing member is slideable between the first and second positions along a linear path. By providing such an arrangement, the dispenser is able to move along the shortest path between the first and second positions, reducing the space necessary in the appliance to allow the dispenser to move and allowing the drive mechanisms to be correspondingly smaller.

9 Claims, 6 Drawing Sheets

FOREIGN PATENT DOCUMENTS

| | | |
|---|---|---|
| EP | 1 785 074 | 5/2007 |
| EP | 1 815 774 | 8/2007 |
| FR | 2 605 906 | 5/1988 |
| FR | 2 704 497 | 11/1994 |
| FR | 2 836 842 | 9/2003 |
| FR | 2879426 | 6/2006 |
| GB | 2 455 330 | 6/2009 |
| JP | 9-192542 | 7/1997 |
| JP | 9-259349 | 10/1997 |
| WO | WO-97/47376 | 12/1997 |
| WO | WO-2006/053456 | 5/2006 |
| WO | WO-2008/135709 | 11/2008 |

OTHER PUBLICATIONS

International Search Report and Written Opinion directed at counterpart International application PCT/GB2008/001228 mailed on Mar. 7, 2008; 8 pages.

GB Search Report dated Feb. 26, 2009, directed to related GB Patent Application No. GB-0820058.6; 1 page.

* cited by examiner

DISPENSER FOR A DOMESTIC APPLIANCE

REFERENCE TO RELATED APPLICATIONS

This application claims the priority of United Kingdom Application No. 0708704.2, filed May 4, 2007, the contents of which are incorporated herein by reference.

FIELD OF THE INVENTION

The present invention relates to a dispenser for an appliance. Particularly, but not exclusively, the present invention relates to a dispenser for a domestic appliance.

BACKGROUND OF THE INVENTION

Domestic appliances for dispensing liquids are well known. Examples of these include: coffee machines, water dispensers and juicers. It is useful for these appliances to be as small as possible so that they can fit neatly into a domestic environment. Further, it is aesthetically pleasing for the appliance to have a "clean" appearance. Therefore, it is undesirable for parts to project from the appliance.

It is known for an appliance to have a retractable dispenser. EP 1656863 discloses a mixing head for a beverage production machine. The mixing head is movable on a curved path between open and closed positions. Another example of a liquid dispenser with a movable nozzle is disclosed in U.S. Pat. No. 3,622,047. This document discloses a nozzle which moves on a circular or elliptical path between open and closed positions.

The above prior art arrangements are useful in that they provide retractable nozzles or dispensers for convenience and cleanliness purposes. However, these arrangements have the drawback that the retractable nozzles or dispensers move along curved paths between open and closed positions. Therefore, sufficient space is required for both the movement of the nozzle/dispenser along the curved path and for appropriate drive means such as a cam, a pivot or another arrangement. This results in a larger appliance to contain the necessary components.

SUMMARY OF THE INVENTION

Therefore, it is an object of the present invention to provide a dispenser for a fluid which is movable between retracted and extended positions whilst requiring less space than prior art arrangements.

According to the invention, there is provided a domestic appliance having a casing and a dispenser, the dispenser including a dispensing member for dispensing a fluid, the dispensing member being movable between a first position in which at least a part of the dispensing member is located within the casing and a second position in which the dispensing member projects from the casing, wherein the dispensing member is slideable between the first and second positions along a linear path.

By providing such an arrangement, the dispenser is configured to move along the shortest path between the first and second positions, reducing the space necessary in the appliance to allow the dispenser to move. A further advantage of this arrangement is that it allows the drive mechanism to be more compact.

Preferably, the dispensing member is slideable along a substantially horizontal axis. By providing such an arrangement, the dispensing member can have a compact arrangement. This reduces the size and cost of the dispenser and consequently that of the appliance.

Preferably, the dispensing member further comprises a dispensing aperture which is located within the casing when the dispensing member is in the first position and projects from the casing when the dispensing member is in the second position. By providing such an arrangement, the dispensing aperture is located within the casing when the appliance is not in use. This reduces the risk of contamination of the dispensing aperture and prevents the dispensing aperture from dripping.

Preferably, the dispensing member is adapted and arranged to rotate when moving between the first and second positions. More preferably, the appliance is arranged on a support surface and the dispensing member is adapted and arranged to rotate such that, in the first position, the dispensing aperture faces away from the support surface and, in the second position, the dispensing aperture faces towards the support surface. This arrangement prevents dripping of liquid from the dispensing aperture during retraction and storage of the dispensing member. This is because the dispensing aperture will be rotated such that it faces away from the support surface and any fluid remaining in the dispensing member will be captured within the dispensing member.

Preferably, a part of the dispensing member lies substantially flush with the casing when in the first position. By providing such an arrangement, when the dispensing member is stored, the domestic appliance has a pleasing visual appearance and can be cleaned easily.

Preferably, the domestic appliance further comprises drive means for moving the dispensing member between the first and second positions. More preferably, the drive means comprises an electric motor and a gearing arrangement.

More preferably, the gearing arrangement comprises a leads screw and a follower.

Alternatively, the gearing arrangement comprises a rack and pinion arrangement.

Preferably, the dispensing member is movable to a third position in which the dispensing member is removable for cleaning. More preferably, in the third position, the dispensing member is located within, and spaced from, the casing. The third position may be one in which the dispensing member is retracted completely within the casing of the domestic appliance. In this case the dispensing member is spaced from the casing itself, facilitating removal for cleaning.

Preferably, the dispensing member further comprises a movable member which is adapted and arranged to move relative to the dispensing member. More preferably, the movable member is adapted and arranged to move relative to the dispensing member when the dispensing member is in the second position. More preferably, the movable member is adapted and arranged to move in a direction which is substantially perpendicular to the direction of movement of the dispensing member.

By providing such an arrangement, the spout can be compact for storage yet have both horizontal and vertically moving parts. This may be useful, for example, if a part of the spout is required to be inserted into a receptacle.

Preferably, the movable member has a dispensing aperture for dispensing a fluid. More preferably, the fluid is a liquid.

Preferably, the domestic appliance is a coffee machine.

Alternatively, the domestic appliance is a water dispenser.

Alternatively, the domestic appliance is a juice dispenser.

According to the invention, there is also provided a dispenser for dispensing a liquid from a domestic appliance, the dispenser including a dispensing member having a dispensing aperture, the dispensing member being movable relative to the remainder of the dispenser between a first position in which the dispensing member is retracted and a second position in which the dispensing member is extended, the dispenser further including drive means for moving the dispensing member between the first and second positions, wherein the dispensing member is slideable between the first and second positions along a linear path.

By providing such an arrangement, the dispenser can be compact and fit in a small space in a domestic appliance, whilst achieving the required functionality.

BRIEF DESCRIPTION OF THE DRAWINGS

Embodiments of the invention will now be described with reference to the accompanying drawings, in which.

DETAILED DESCRIPTION OF THE INVENTION

Figure 1:
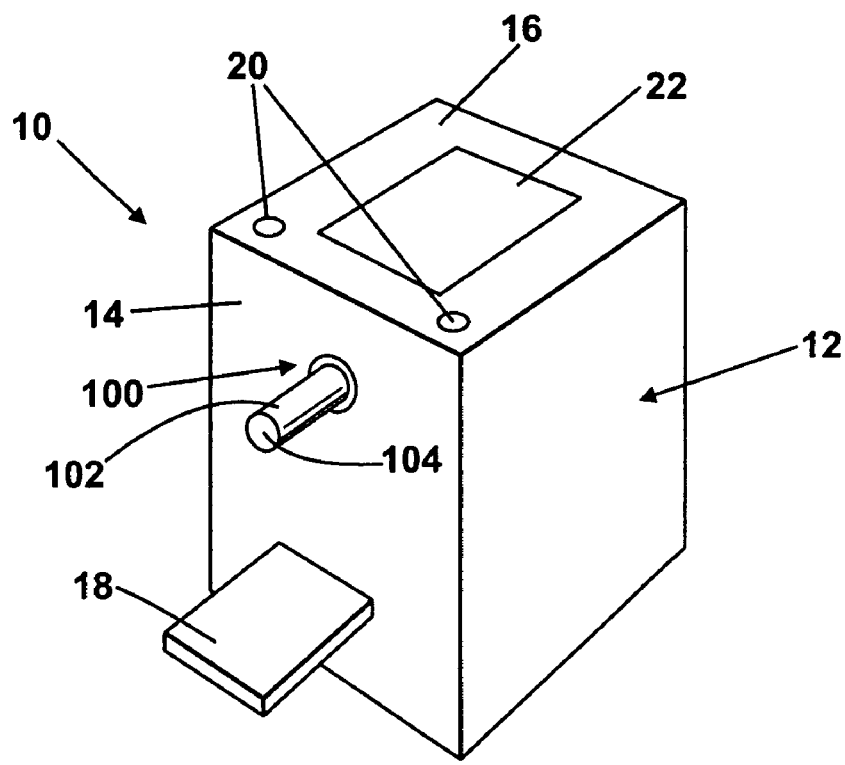
FIG. 1 is an isometric view of an appliance including a dispenser according to the present invention.
Figure 2:
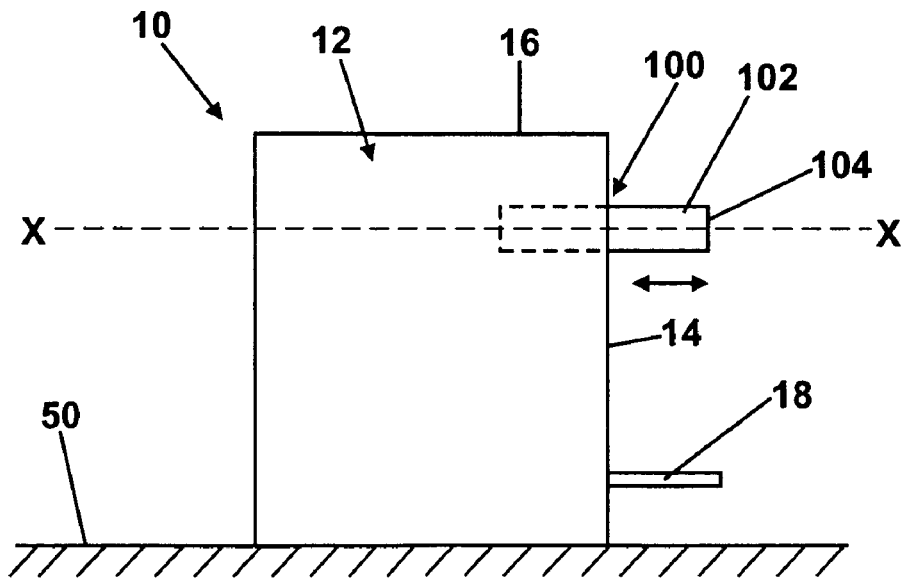
FIG. 2 is a side view of the appliance of FIG. 1.

FIGS. 1 and 2 show an example of an appliance 10. In this example, the appliance 10 is adapted for producing and dispensing coffee. However, other beverages or liquids could also be dispensed. The appliance 10 includes a casing 12 having a front face 14 and an upper face 16. The front face 14 includes a support tray 18. The upper face 16 of the casing 12 includes a plurality of selection buttons 20 through which the appliance 10 can be operated. The upper face 16 also includes an access panel 22 through which ingredients can be introduced to the appliance 10. Alternatively, components of the appliance 10 can be removed for cleaning through the access panel 22.

A dispenser 100 according to a first embodiment of the invention is located in the casing 12 and extends through an aperture formed in the front face 14 of the casing 12. The dispenser 100 includes a dispensing spout 102 which is shown in an extended position in FIGS. 1 and 2. In the extended position, the dispensing spout 102 projects from the front face 14 of the casing 12. The dispensing spout 102 extends horizontally from the front face 14 of the casing 12 when the appliance 10 is supported on a horizontal support surface 50 such as a table or worktop. In other words, the spout 102 is arranged to extend from the casing 12 approximately parallel to the support surface 50 upon which the appliance 10 is supported.

The dispensing spout 102 is arranged to be slideable between extended and retracted positions along an axis X-X (FIG. 2). The axis X-X lies horizontally when, in normal use, the appliance 10 is supported on a horizontal support surface 50 as shown in FIG. 2. In other words, the axis X-X lies parallel to the support surface 50. In this arrangement, the axis X-X is also perpendicular to the front face 14 of the casing 12.

FIG. 2 also shows (in broken lines) the position of the dispensing spout 102 when retracted. In the retracted position, the dispensing spout 102 lies within the casing 12. In this position, an end face 104 of the dispensing spout 102 lies flush with the front face 14 of the casing 12.

In use, a user places a suitable receptacle (for example, a cup or mug) on the support tray 18. The user then selects a desired drink by pressing one of the plurality of selection buttons 20 on the upper face 16 of the casing 12. The dispensing spout 102 is moved from a retracted position to an extended position. The appliance 10 processes a drink which is then dispensed from the dispensing spout 102 into the receptacle provided. When the process is finished, the dispensing spout 102 can be moved from the extended position back into the retracted position for storage.

Figure 3:
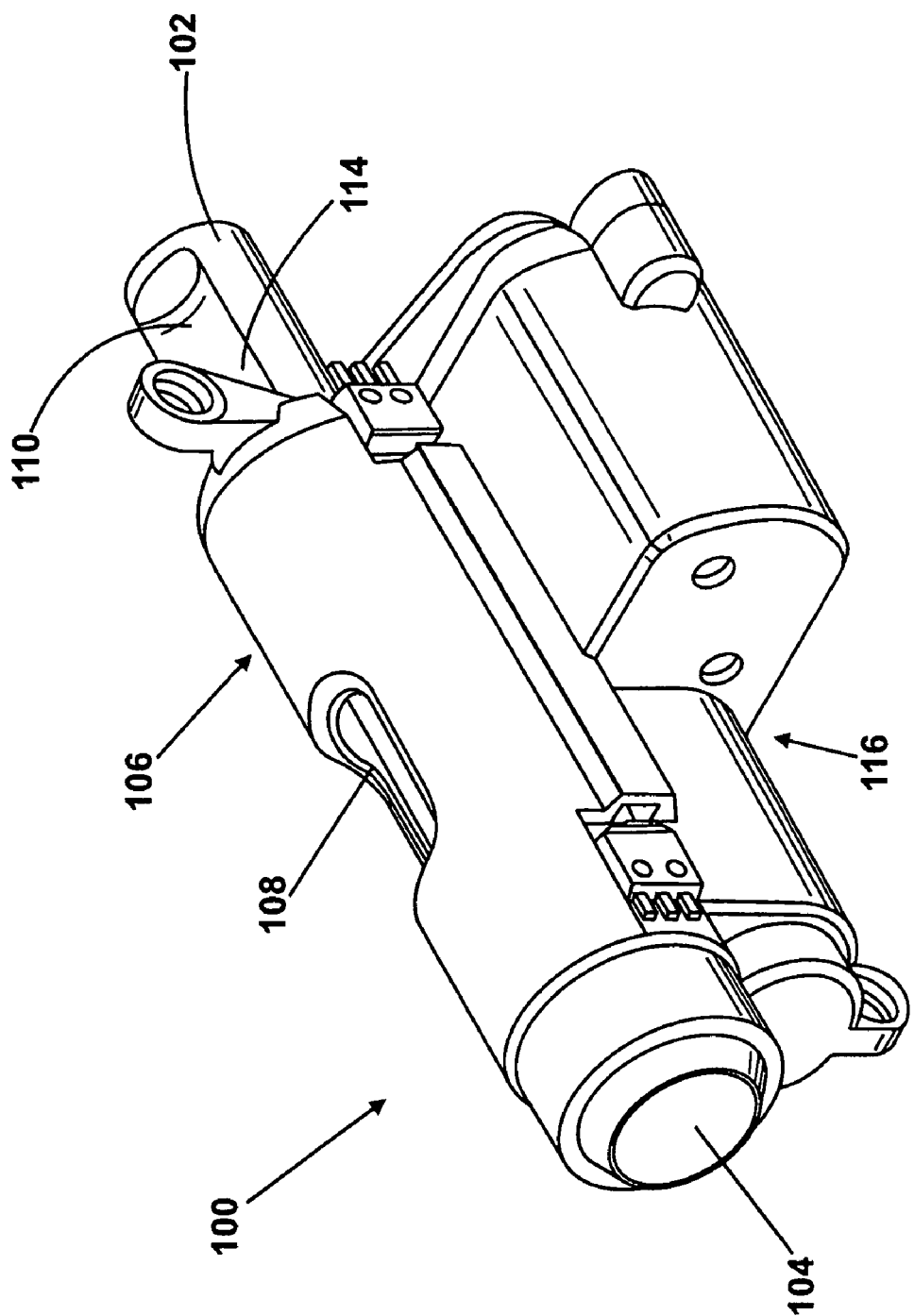
FIG. 3 is an isometric view of the dispenser according to a first embodiment of the invention showing a spout in a retracted position.
Figure 4:
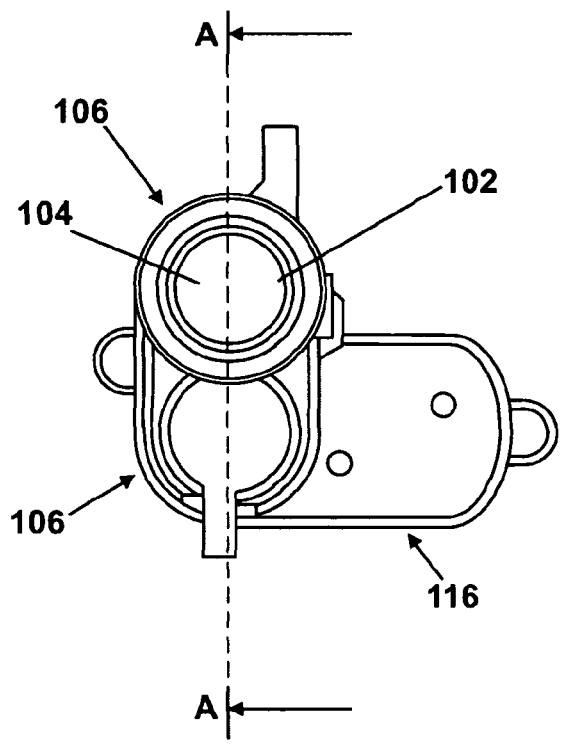
FIG. 4 is a front view of the dispenser of FIG. 3.
Figure 5:
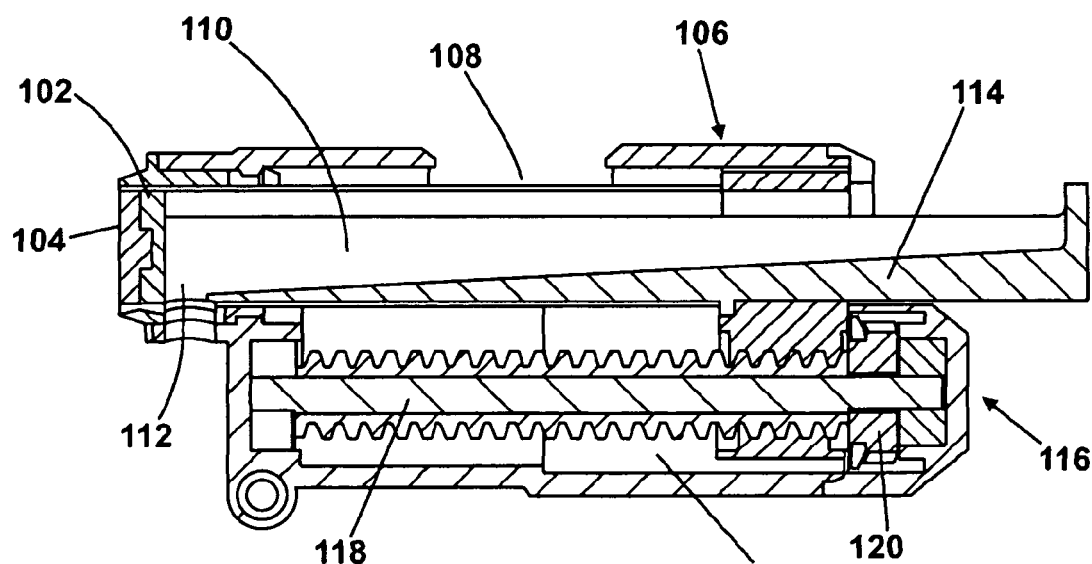
FIG. 5 is a side section taken along the line A-A of FIG. 4 showing the dispenser of FIG. 3.

FIGS. 3, 4 and 5 show the dispenser 100 according to the first embodiment in more detail. The dispenser 100 includes an outer casing 106. The spout 102 is located within the outer casing 106 and is moveable therein. The outer casing 106 includes a receiving aperture 108. The receiving aperture 108 is arranged to receive a pipe or other fluid conduit (not shown) which can be connected or located in communication therewith.

The spout 102 further comprises a cavity 110. The cavity 110 is trough shaped and has an open upper end. The open upper end is in communication with the receiving aperture 108 in order to receive liquid passing through the receiving aperture 108. A dispensing aperture 112 is located at one end of the cavity 110 and forms an outlet from the cavity 110. The base 114 of the cavity 110 is sloped such that the dispensing aperture 112 is located at the lowermost end of the cavity 110 (FIG. 5). This arrangement encourages liquid in the cavity 110 to move towards the dispensing aperture 112. The cavity 110 extends along almost the entire length of the spout 102, enabling the receiving aperture 108 to be in communication with the cavity 110 irrespective of the position of the spout 102 relative to the outer casing 106.

The dispenser 100 also includes a drive mechanism 116. The drive mechanism 116 is located beneath the spout 102 and is arranged to drive the spout 102 from the retracted position to the extended position. The drive mechanism 116 includes a motor (not shown).

The drive mechanism 116 is shown in more detail in FIG. 5. The drive mechanism 116 comprises a lead screw 118 which is driven by the motor via a gear (not shown) and a toothed belt 120. The lead screw 118 has a follower 122. The follower 122 is connected to the spout 102 and is arranged to move back and forth along the lead screw 118 when the motor is driven. This moves the spout 102 back and forth relative to the outer casing 106. In the retracted position, the follower 122 is located at a first end of the lead screw 118. The gear, the toothed belt 120 and the lead screw 118 have gear ratios such that, when the motor is driven at an appropriate speed, the spout 102 moves from the retracted to the extended position in approximately 0.5 seconds.

Figure 6:
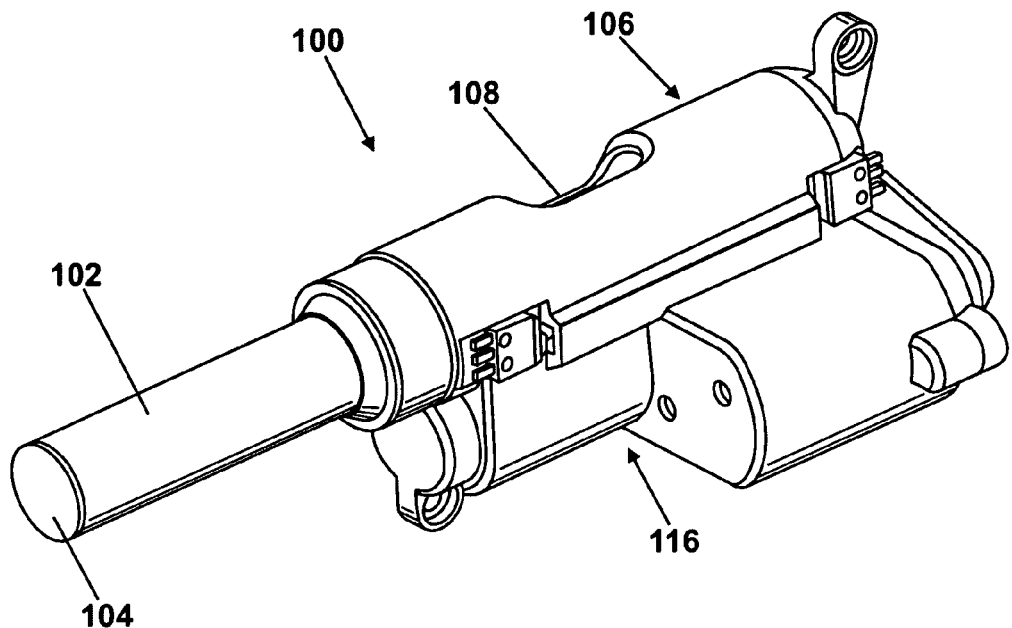
FIG. 6 is an isometric view of the dispenser of FIG. 3 showing the spout in an extended position.
Figure 7:
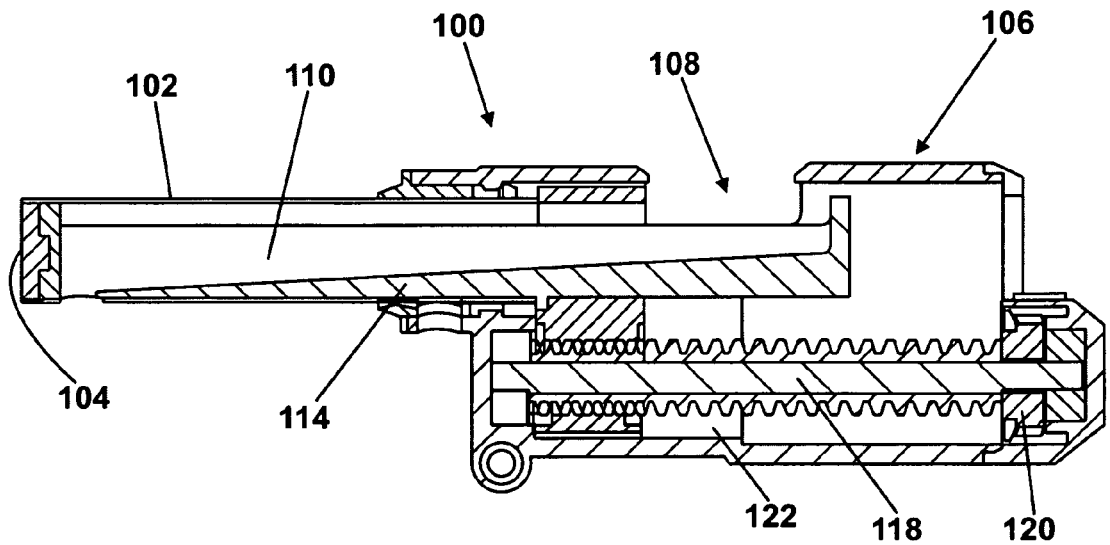
FIG. 7 is a side section taken along the line A-A of FIG. 4 showing the spout in the extended position.

FIGS. 6 and 7 show the spout 102 in the extended position. In the extended position, the spout 102 extends from the outer casing 106. When the dispenser 100 is located in the appliance 10 and the spout 102 is in the extended position as shown in FIGS. 1 and 2, the spout 102 also projects from the appliance 10. In this position, the follower 122 is located at a second end of the lead screw 118. In the extended position, the cavity 110 is in communication with the receiving aperture 108, allowing liquid to be introduced to the cavity 110 for dispensing.

In use, the user places a cup or mug on the supporting platform 18 and selects a drink by pressing one of the selection buttons 20. At this stage, the spout 102 is in the retracted, or stored, position. The motor is then activated, which rotates in a first direction. This action rotates the gear, the toothed belt 120 and the lead screw 118. The lead screw 118 rotates in a clockwise direction (with respect to FIG. 4) and moves the follower 122 from the first end of the lead screw 118 (as shown in FIG. 5) to the second end of the lead screw 118 (as shown in FIG. 7). The spout 102 is mounted on the follower 122 and moves therewith from the retracted position (FIG. 5) to the extended position (FIG. 7). When the follower 122 reaches the second end of the lead screw 118, the spout 102 is fully extended and the motor is stopped. The dispenser 100 is now configured to dispense a liquid such as coffee or hot water. A liquid beverage is prepared in the appliance 10 (for example, in a coffee brewing head or hot water receptacle). The liquid is then introduced into the cavity 110 through the receiving aperture 108. Due to the sloping, tapered shape of the cavity 110, the liquid will flow towards the dispensing aperture 112, through the dispensing aperture 112 and out into the cup or mug.

When the liquid dispensing operation has been completed, the spout 102 can be moved back to the retracted position for storage. The end of the liquid dispensing operation can be automatically detected by sensors (not shown) in the appliance 10. Alternatively, the user may retract the spout 102 by pressing one of the selection buttons 20. In order to retract the spout 102, the motor rotates in a second direction opposite to the first direction. The gear and toothed belt 120 are rotated and the lead screw 118 is rotated in the anticlockwise direction (with respect to the view shown in FIG. 4). This action moves the follower 122 from the second position back to the first position, and the spout 102 is moved from the extended position to the retracted position. When the follower 122 reaches the first end of the lead screw 118, the spout 102 is retracted and the motor is stopped.

FIGS. 8 to 12 show a dispenser 200 according to a second embodiment of the invention. The dispenser 200 is suitable for use in the appliance 10 of FIGS. 1 and 2. Looking firstly at FIGS. 8, 9 and 10, the dispenser 200 comprises a storage portion 202 and a spout 204. The storage portion 202 comprises a cylindrical storage portion 206, a connecting conduit 208 and a base 210. The connecting conduit 208 forms a conduit between the storage portion 206 and the interior of the spout 204. The connecting conduit 208 comprises a curved portion and a cylindrical portion. The cylindrical portion is coaxial with, and extends inside, the spout 204. The base 210 is arranged to admit a liquid flow from other parts of the appliance 10 into the storage portion 206.

The spout 204 is slideably movable along the cylindrical part of the connecting conduit 208. The spout 204 moves along the axis X-X between fully retracted and extended positions. The spout 204 is shown in the fully retracted position in FIGS. 8-10. In the fully retracted position the connecting conduit 208 extends through almost the full length of the spout 204. A seal (not shown) seals between the connecting conduit 208 and the spout 204.

The spout 204 further comprises a dispensing aperture 212 for dispensing a liquid from the storage portion 202. When in the fully retracted position, the dispensing aperture 212 faces away from the supporting surface 50.

The spout 204 is driven by a drive mechanism which is similar to the drive mechanism 116 of the dispenser 100 and will not be discussed any further here. The drive mechanism drives the spout 204 through a drive member 214. The drive member 214 is coupled to the spout 204 through a circumferential groove 216 formed at the proximal end of the spout 204. The spout 204 is further supported by a lug 218 located beneath the spout 204. The lug 218 engages with a helical groove 220 formed in the outer wall of the spout 204.

Figure 8:
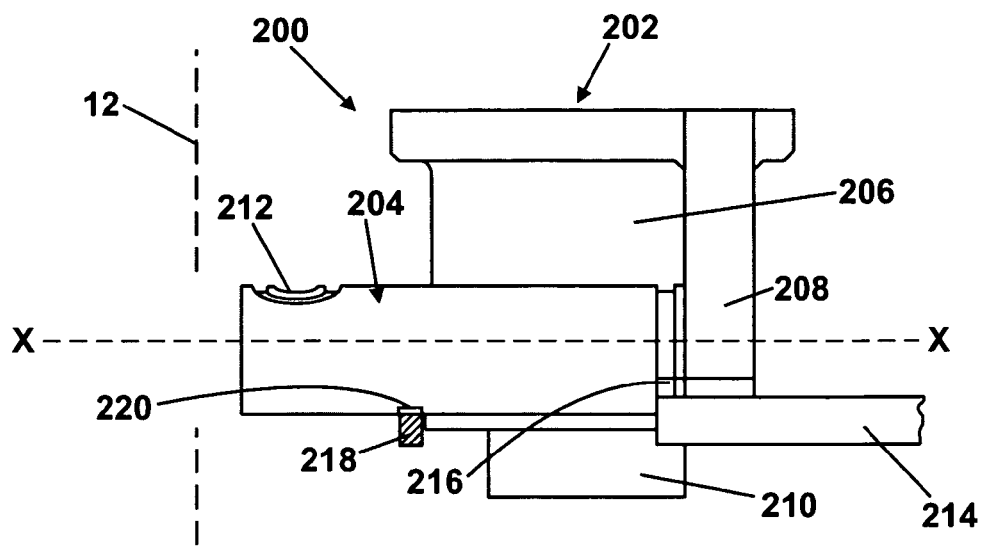
FIG. 8 is a side view of a dispenser according to a second embodiment of the invention, showing a spout in a fully retracted position.
Figure 9:
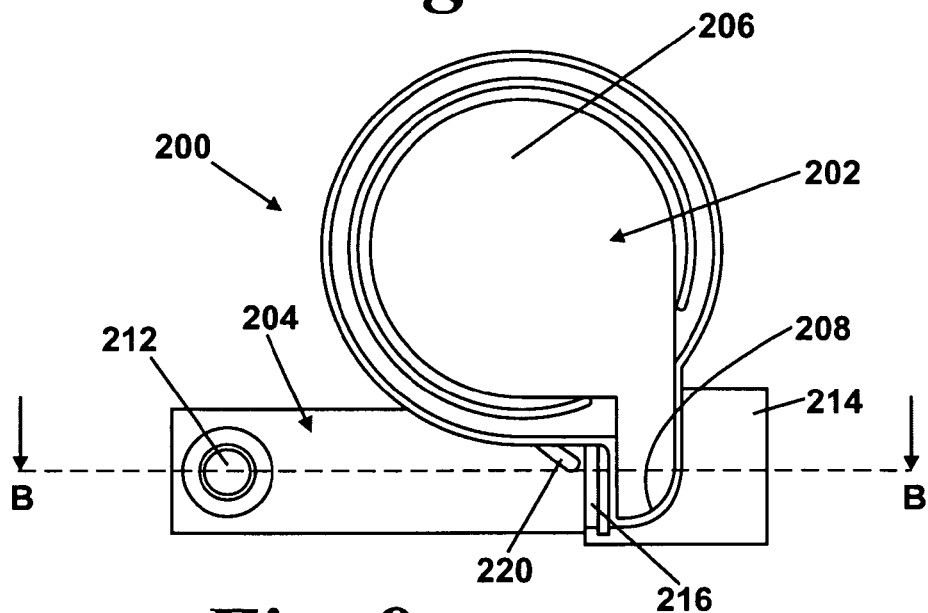
FIG. 9 is a plan view of the dispenser of FIG. 8.
Figure 10:
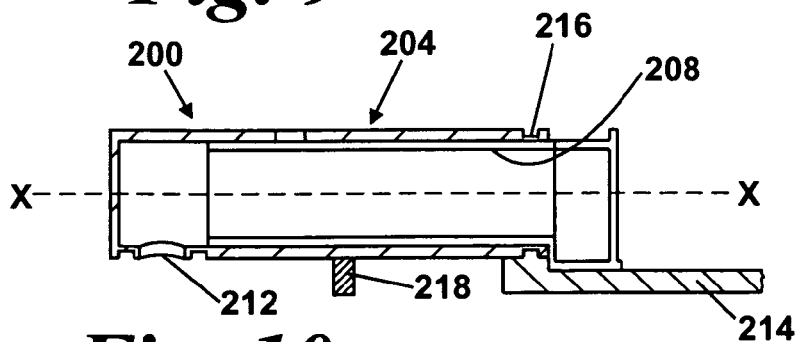
FIG. 10 is a section through the line B-B of FIG. 9 showing the dispenser of FIG. 8.

The spout 204 is movable between three positions. The fully retracted position (as shown in FIGS. 8, 9 and 10) allows the spout 204 and the storage portion 202 to be cleaned. In the fully retracted position, the spout 204 is recessed within the casing 12 (FIG. 8). This arrangement allows parts of the dispenser 200 to be removed through the access panel 22 for cleaning. The storage portion 202 and the spout 204 are arranged to be removed from the remainder of the dispenser 200. When cleaning is required, the spout 204 can be lifted clear of the lug 210 and drive member 214, and the storage portion 202 can be decoupled from a connector (not shown) located at the base 210.

Figure 11:
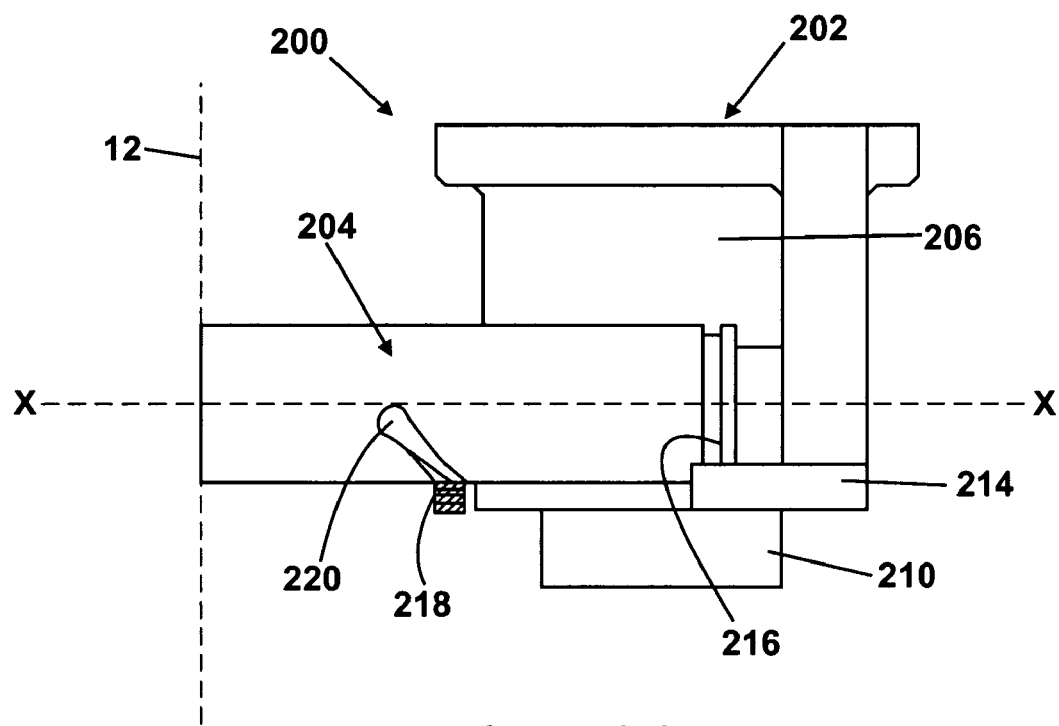
FIG. 11 is a side view of the dispenser of FIG. 8 showing the spout in a retracted position.
Figure 12:
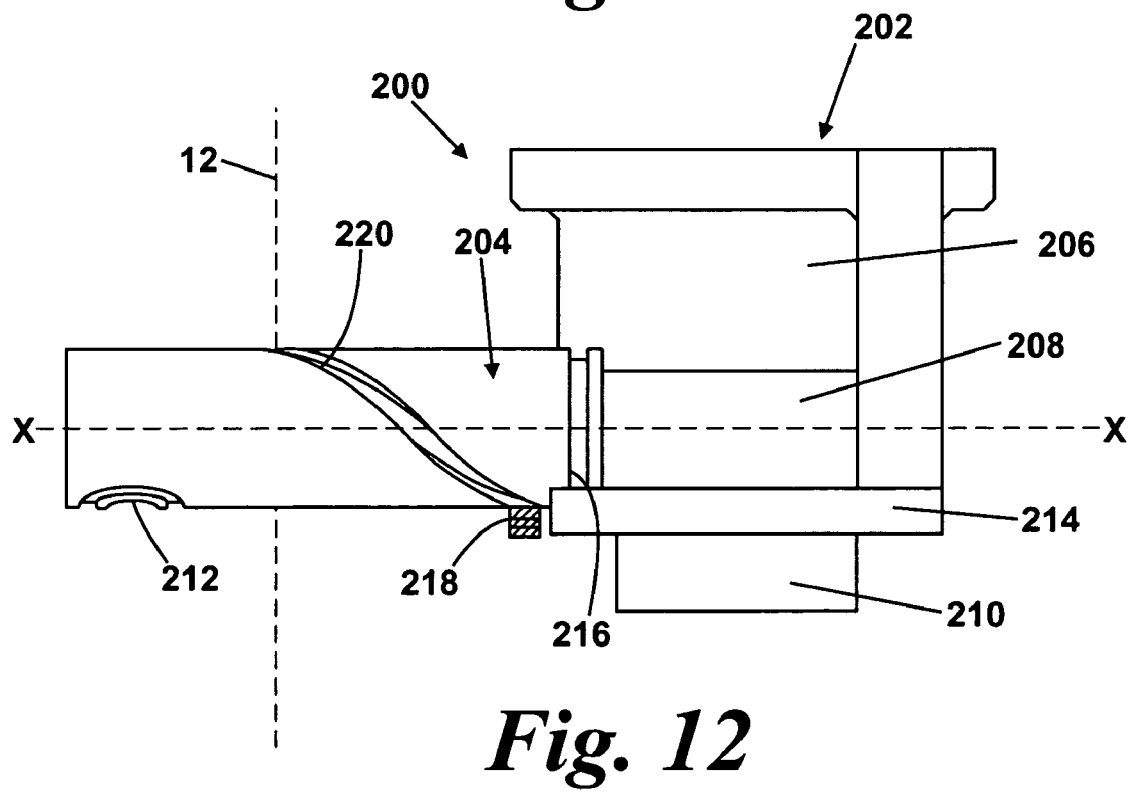
FIG. 12 is a side view of the dispenser of FIG. 8 showing the spout in an extended position.

Two further positions of the spout 204 are shown in FIGS. 11 and 12. In FIG. 11, the spout 204 is shown in the retracted position. The retracted position is the normal storage position. In this position, the end of the spout 204 lies flush with the casing 12. FIG. 12 shows the spout 204 in the extended position. In the extended position, the spout extends from the casing 12 coaxial with the axis X-X. In this position, a liquid can be dispensed from the dispenser 200.

The spout 204 is also rotatable relative to the remainder of the dispenser 200 about the axis X-X. This rotation is achieved by the location of the lug 218 in the helical groove 220. When the spout is moved between the fully retracted, retracted and extended positions, the relative movement of the lug 218 with respect to the helical groove 220 causes the spout 204 to rotate about the direction of movement when the spout 204 is retracted or extended. The rotation is arranged such that, when in the fully retracted or retracted positions, the dispensing aperture 212 faces away from the support surface 50, and in the extended position, the dispensing aperture 212 faces towards the support surface 50.

In use, the user places a cup or mug on the supporting platform 18 and selects a drink by pressing one of the selection buttons 20. At this stage, the spout 204 is in the retracted, or stored, position shown in FIG. 11. A motor (not shown) forming part of the drive mechanism is then activated, which rotates in a first direction. Through the drive mechanism, the drive member 214 is moved. The spout 204 is coupled to drive member 214 by the location of the drive member 214 in the circumferential groove 216 and moves from the retracted position (FIG. 11) to the extended position (FIG. 12). When this happens, movement the lug 218 relative to the helical groove 220 causes the spout 204 to rotate about the axis X-X between the retracted and extended positions. As a result of this, the dispensing aperture 212 moves from a position facing away from the support surface 50 (FIG. 11) to a position facing towards the support surface 50 (FIG. 12).

The drive mechanism will slideably move and rotate the spout 204 until the spout 204 is in the extended position shown in FIG. 12. The motor is then stopped. The dispenser 200 is now configured to dispense a liquid such as coffee or hot water. A liquid beverage is prepared in the appliance 10 (for example, in a coffee brewing head or hot water receptacle). The liquid then passes to the storage portion 202 and is introduced into the spout 204 via the connecting conduit 208. The liquid is then dispensed into the cup or mug through the dispensing aperture 212.

When the liquid dispensing operation has been completed, the spout 204 can be moved back to the retracted position for storage. The user may retract the spout 204 by pressing one of the selection buttons 20. In order to retract the spout 204, the motor rotates in a second direction opposite to the first direction and the drive mechanism moves the drive member 214 back to the retracted position as shown in FIG. 11. Consequently, the spout 204 is moved from the extended position to the retracted position. During this operation, the spout 204 rotates about the axis X-X such that the dispensing aperture 212 moves from a position facing towards the support surface 50 to a position facing away from the support surface 50. When the spout 204 reaches the retracted position, the motor is stopped.

When parts of the dispenser 200 require cleaning, the user opens the access panel 22. This causes the drive mechanism automatically to retract the spout 204 to the fully retracted position. In the fully retracted position (as shown in FIG. 8), the whole of the spout 204 is located within the casing 12 such that the distal end of the spout 204 is spaced from the casing 12. The user can then disconnect the storage portion 202 and the spout 204 from the remainder of the dispenser 200. These components can then be removed through the access panel 22 for cleaning. The storage portion 202 and the spout 204 can then be replaced by locating the base 210 of the storage portion 202 in the connector, the drive member 214 in the circumferential groove 216 and the lug 218 in the helical groove 220. The access panel 22 can then be closed and normal operation of the appliance 10 resumed.

The invention is not limited to the detailed description given above. Variations will be apparent to the person skilled in the art. For example, the dispenser need not be located in a coffee machine. The dispenser could also be used in other types of appliance; for example, a juicer or a water dispenser. Any suitable construction of appliance could be used; for example; vending machines, soft drinks dispensers, cleaning fluid dispensers etc.

The spout may have further moving components. For example, spout may comprise a movable member which, when the spout is extended from the casing of the appliance, may extend from within the spout. The movable member may be located in the dispensing aperture, or may be located at the distal end of the spout. Such an arrangement may be useful, for example, if the spout is required to dispense a fluid into a receptacle already containing a fluid. Further, the fluid which is dispensed may then be recirculated; for example, in a milk steaming arrangement. The spout first extends horizontally as described in the embodiments herein. Then the movable member extends downwardly from the spout into the receptacle. Other arrangements of movable member may be used; for example, a further telescoping section coaxial with the spout, an upwardly extending conduit or a conduit that extends to one side. The movable member will then move back inside the spout when the spout is retracted back into the casing.

Other arrangements for driving the spout could be used; for example, a rack and pinion system, a belt drive or a hydraulic arrangement. Further, other arrangements for rotating the spout could be used. The spout may be rotated by a shaft coaxial with the spout, for example.

The spout need not project from the front face of the appliance. The spout may, for example, project from the side or corner of the appliance as required. Further, the casing need not be perpendicular to the direction of movement of the spout. What is important is that the spout is able to move along a linear path between the retracted and extended positions.

Further, additional types of liquid could be used in addition to the foodstuff products discussed herein. For example; any suitable foodstuff products which can be dispensed in liquid form may be used. Examples of these are: hot or cold milk, fruit purees, pulps, soft drinks, carbonated drinks and concentrated juices. Alternatively, fluids other than liquids could be used; for example, steam.

The invention claimed is:

1. A domestic appliance comprising:
   a casing;
   a dispenser, the dispenser comprising a dispensing member for dispensing a fluid, the dispensing member being movable between a first position in which at least a part of the dispensing member is located within the casing and a second position in which the dispensing member projects from the casing; and
   a drive for moving the dispensing member between the first and second positions, the drive comprising an electric motor and a gearing arrangement,
   wherein the dispensing member is slideable between the first and second positions along a linear path.

2. A domestic appliance as claimed in claim 1, wherein the dispensing member is slideable along a substantially horizontal axis.

3. A domestic appliance as claimed in claim 1, wherein the dispensing member further comprises a dispensing aperture which is located within the casing when the dispensing member is in the first position and projects from the casing when the dispensing member is in the second position.

4. A domestic appliance as claimed in claim 3, wherein the dispensing member is adapted and arranged to rotate when moving between the first and second positions.

5. A domestic appliance as claimed in claim 4, wherein the domestic appliance is arranged on a support surface and the dispensing member is adapted and arranged to rotate such that, in the first position, the dispensing aperture faces away from the support surface and, in the second position, the dispensing aperture faces towards the support surface.

6. A domestic appliance as claimed in claim 1, wherein a part of the dispensing member lies substantially flush with the casing when in the first position.

7. A domestic appliance as claimed in claim 1, wherein the gearing arrangement comprises a lead screw and a follower.

8. A domestic appliance as claimed in claim 1, wherein the dispensing member is movable to a third position in which the dispensing member is removable for cleaning.

9. A domestic appliance as claimed in claim 8, wherein, in the third position, the dispensing member is located within, and spaced from, the casing.

* * * * *